United States Patent [19]
Crack

[11] Patent Number: 4,606,237
[45] Date of Patent: Aug. 19, 1986

[54] CONTROL DEVICE

[75] Inventor: David J. Crack, Chelmsford, England

[73] Assignee: Teleflex Morse Limited, Basildon, England

[21] Appl. No.: 501,071

[22] Filed: Jun. 6, 1983

[30] Foreign Application Priority Data

Jun. 14, 1982 [GB] United Kingdom ............... 8217181

[51] Int. Cl.$^4$ .............................................. G05G 9/00
[52] U.S. Cl. ................................ 74/471 XY; 74/501 R
[58] Field of Search .......... 74/473 R, 471 XY, 501 R; 137/636.2

[56] References Cited

U.S. PATENT DOCUMENTS

| | | | |
|---|---|---|---|
| 3,541,877 | 11/1970 | Houk | 74/471 XY |
| 3,705,519 | 12/1972 | Sjoo | 74/471 XY |
| 3,811,336 | 5/1974 | Pulskamp | 74/471 XY |
| 3,891,042 | 6/1975 | Braun | 74/471 XY |
| 4,459,870 | 7/1984 | Gill et al. | 74/471 XY |

FOREIGN PATENT DOCUMENTS 1604616 12/1981 United Kingdom .

Primary Examiner—James C. Yeung
Attorney, Agent, or Firm—James C. Wray

[57] ABSTRACT

A control device 1 comprises an operator lever 2 fast at its lower end with a lever block 3 which carries a ball stud 4 of which the ball 7 is mounted for universal pivoting in a fixed ball housing 8. A cross shaft 13 is mounted for rotation about its axis in the lever block 3, and links 17 are pivotally connected to opposite ends of the cross shaft and each to an axially movable output member 20. The operator lever 2 can be pivoted about axes passing through the center of the universally pivoted ball 7 to cause axial movements of the output members, either together in the same direction or in opposite directions or one only at a time. A gate may be provided for the operator lever 2 to confine the ball 7 to pivot only about defined axes. A spring 24 may be provided which becomes loaded upon movement of each output member 20 either side of a neutral position to bias the output member and hence the operator lever 2 back to neutral. The output members 20 may operate push pull control cables.

21 Claims, 4 Drawing Figures

CONTROL DEVICE

This invention relates to control devices.

According to the invention there is provided a control device comprising a pivotable lever means, a pair of axially movable output members which are movable in response to pivotal movement of the lever means, a cross shaft mounted for rotation about its axis in said lever means, and a pair of links one for each output member and pivotally connected to opposite ends of the cross shaft and each to the respective output member.

In our United Kingdom Pat. Nos. 1,604,617 and 1,604,618 there is described a dual axis control box in which an operator lever is pivotally mounted by a ball stud in a fixed post and carries two further ball studs each slidably mounted in an aperture within the upper end of an axially movable output member so that selected pivotal movement of the lever will, through the "further" ball studs, cause the output members to translate upwardly or downwardly from a central or neutral position against the bias of a compression spring which is unloaded when the respective output member is in neutral and which becomes loaded so tending to return the output member and the operator lever to neutral when it is moved therefrom.

The operating connection between the "further" ball studs and the apertured output members imposes a restriction upon the degree of axial travel which can be imparted to the output members. If the control box is modified to incorporate a control device constructed in accordance with the present invention, that axial travel can be doubled. In a preferred embodiment, the axial travel is increased from ±12 mms to ±20 mms.

In order that the invention may be well understood the preferred embodiment thereof, which is given by way of example of the invention, will now be described with reference to the accompanying drawings, in which.

Figure 1:
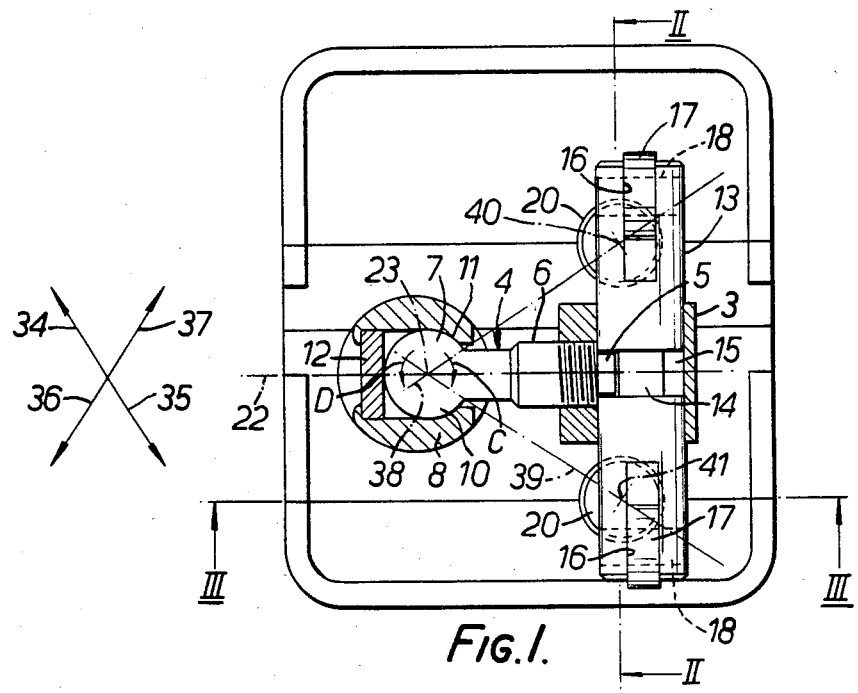
FIG. 1 is a plan view of a control device.

A control device 1 includes an operator lever 2 whose lower end is fast with a lever block 3 by being screwthreaded therein. A ball stud 4 is carried by the lever block 3 by having its stem 5 screwthreaded therein and tightened in position by means of spanner flats 6. The ball 7 of the ball stud 4 is received in a ball housing 8 of a fixed post 9. The ball housing 8 is constituted by an aperture 10 of which one end is fashioned at 11 complementary to the spherical surface of the ball and by a plate 12 which is suitably secured within the aperture to confine the ball 7 adjacent the spherical aperture end 11 so that the ball stud 4 can pivot universally about the centre of its ball 7 but is otherwise restrained against movement.

A cross shaft 13 is journalled for rotation in the lever block 3 and has its opposite ends projecting outwardly therefrom. The cross shaft 13 has a centre portion 14 of reduced diameter to provide an annular recess 15 within which is received the screwthreaded stem 5 of the ball stud 4 to inhibit axial movement of the cross shaft but not relative rotation between the cross shaft and the lever block 3.

The opposite ends of the cross shaft 13 are each slotted at 16. Within each slot 16 is received the upper end of a link 17, the two links being pivotally secured to the cross shaft 13 by pivot pins 18. The lower end of each link 17 is received within a slot 19 in the upper end of an output member 20 which is constrained to move axially, and the links 17 are each pivotally secured to the respective output member by pivot pins 21. There is a degree of play available to the links 17 within their respective slots 19 and about their respective pivot pins 21, for a purpose that will appear.

The control device 1 is shown in the neutral position. Considering its geometry, the output members 20 are constrained to move in a vertical axial direction as viewed in FIGS. 2 and 3. The longitudinal axis of the cross-shaft 13 is horizontal as also is that of the ball stud 4 albeit perpendicular thereto. The longitudinal axis of each pivot pin 21 is parallel to that of the ball stud 4, and the longitudinal axis of each pivot pin 18 is substantially parallel to that of the ball stud being slightly inclined thereto to match the position of the respective link 17 which is slightly tilted to the vertical so that its lower end is inclined in its "oversized" slot 19.

Although, as shown, the operator lever 2 can be universally pivoted about the centre of the ball 7, the operation of the control device will best be understood by considering, first, what happens when the operator lever is pivoted about the longitudinal axis 22 of the ball stud 4 and, then, about a transverse axis 23 passing through the centre of the ball 7 and parallel to the longitudinal axis of the cross shaft 13.

Figure 2:
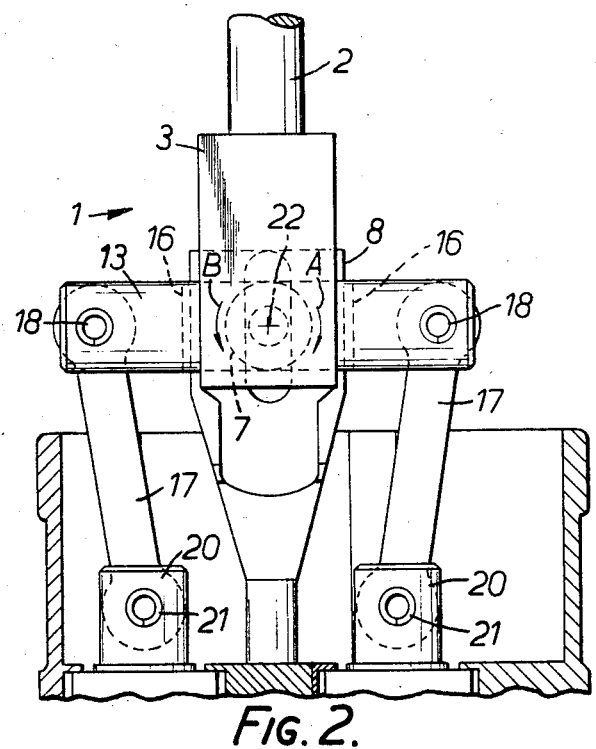
FIG. 2 is a side elevation of the same control device.

Pivoting of the operator lever 2 in a clockwise sense as indicated by arrow A in FIG. 2 about the axis 22 results in the cross shaft 13 pivoting as one with the lever block 3, and hence the right hand end (as viewed in FIG. 2) of the cross shaft will swing downwardly and the left hand end upwardly. The right hand link 17 will, thus, be urged downwardly, pivoting about the pivot pins 18, 21, to urge the associated output member 20 to move vertically downwardly, and the left hand link 17 will be urged upwardly, pivoting about its pivot pins 18, 21, to cause the associated output member 20 to move vertically upwardly.

It should be mentioned that the longitudinal axis 22 is equidistant from the pivot pins 18 so that the links 17 will be urged the same distance in opposite directions as also will the output members 20.

When the operator lever 2 is pivoted in an anticlockwise sense as indicated by arrow B in FIG. 2, the various components will move in the opposite sense or direction from the just described with, ultimately, the left hand output member 20 moving vertically downwardly and the right hand one, vertically upwardly.

Figure 3:
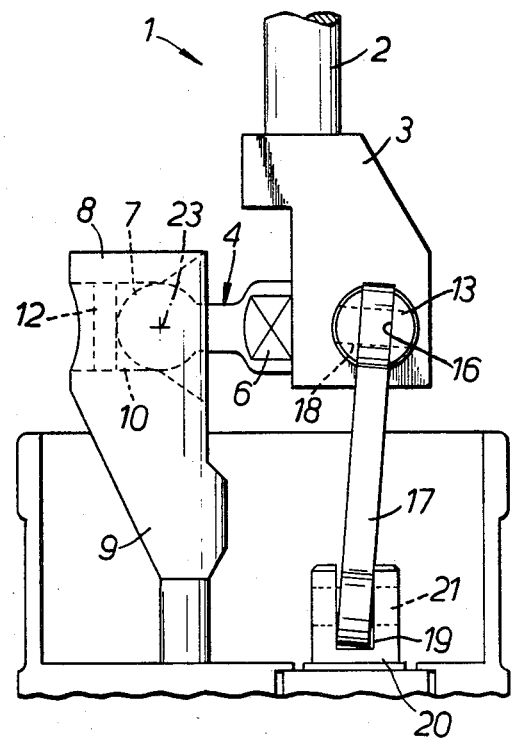
FIG. 3 is an end elevation of the same control device.

Upon the operator pivoting the output lever 2 in a clockwise sense identified by arrow C in FIG. 3 about the transverse axis 23, the resulting pivotal movement of the lever block 3 and the cross shaft 13 will cause the horizontal dimension between the longitudinal axis of the cross shaft 13 and the pivot axis 23 to shorten. Because of the constraint imposed upon the cross shaft 13 by the links 17 the cross shaft will rotate in an anticlockwise sense within the lever block 3 causing the links to straighten towards the vertical as well as urging them downwardly as one to effect the same vertical downward axial movement of each of the output members 20. When the links 17 attain a vertical attitude, the longitudinal axis of each pivot pin 18 will be parallel to that of the ball stud 4.

The straightening of the links 17 and, indeed, their operational movement, is possible because of the oversize slots 19 in the output members 20 and the play available between the links 17 and their pivot pins 21.

It will be appreciated that anticlockwise movement of the operator lever in the sense indicated by arrow D in FIG. 3 causes the output members 20 to move axially vertically upwards by the same distance, the cross shaft 13 rotating in the lever block 3 in a clockwise sense and the orientation of the links 17 changing again as permitted by the oversize slots 19 and the play available at the pivot pins 21.

The control device 1 could be provided with a gate to constrain the operator lever 2 to be moved only about the mutually perpendicular axes 22 and 23 as above described. If no constraint is provided so that the ball 7 is free to pivot universally about its centre, then those skilled in the art will realize that permutations of operator lever movements are possible with attendant combinations of movements available to the output members 20 being variations of those above described.

Advantageously, the control device 1 would be incorporated in a remote control mechanism to operate a pair of push-pull control cables whose cores would be connected each to one output member 20 so that they would be translated, individually or together, when the operator lever 2 is moved.

In our United Kingdom Pat. Nos. 1,604,617 and 1,604,618 to which reference has already been made, each output member is under the influence of a centering spring so that axial movement of the output member either way from its neutral position compresses the spring which, accordingly, acts to bias the output member and the operator lever back to the neutral position. Moreover, when in the neutral position there is no spring force acting on the output member.

The present control device can advantageously be incorporated in the control boxes featured in those patents to operate their output members. A full disclosure for those control boxes is not deemed necessary here. However, a shortened disclosure will be helpful to the reader since it will facilitate an understanding of certain combinations of movements available to the output members additional to those specifically described above.

Figure 4:
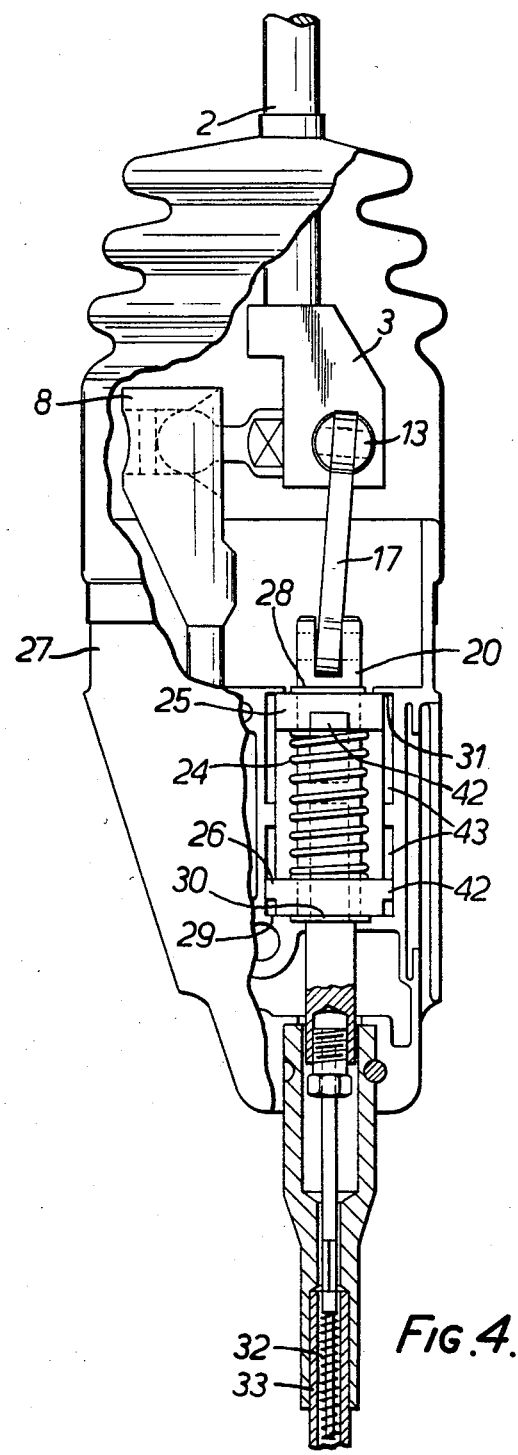
FIG. 4 is a view corresponding to FIG. 3 showing a control box incorporating the control device of FIGS. 1 to 3.

Thus, as shown in FIG. 4, a centering spring 24 is mounted about each output member 20 and between a pair of spring cups or abutment members 25, 26 within which the output member is slidably guided. The spring cups are seated in the housing 27 of the control box. Carried by the output member 20 to overlie the upper spring cup 25 is a circlip 28 which, when the output member is urged downwardly, will effect simultaneous downward movement of that spring cup, with the result that the spring 24 will be compressed between the two spring cups 25,26 since the lower cup 26 is, at that time, restrained by its seating 29 in the housing 27 from downward movement. When the output member 20 is moved upwardly, a circlip 30 underlying the lower spring cup 26 will effect upward movement of that cup so that, again, the spring 24 is compressed between the two spring cups, the upper cup 25 in this instance being prevented by its seating 31 in the housing from upward movement. Accordingly, the spring 24 is compressed as the output member 20 is urged upwardly or downwardly from neutral to impart a spring bias tending to return the output member to neutral.

The control box depicted is constructed such that the operator lever 2 can be pivoted about two mutually displaced axes to give an "X" movement of the lever such that diagonal lever movement on one diagonal can translate the core of one only of the pair of push-pull control cables associated with the pair of output members 20 whilst the core of the other cable remains stationary, and diagonal lever movement on the other diagonal will translate the previously stationary core and not move the other cable core previously translated. In FIG. 4, the cable core, which is operatively connected to an output member 20, is referenced 32 and its casing, which is secured against movement relative to the housing 27, referenced 33.

More particularly, when the operator lever 2 is pivoted in the diagonal direction 34 (see FIG. 1) and about an axis 38 which passes through the centre of the ball 7 and the longitudinal axis 40 of one output member 20, the ball stud 4 will pivot in its housing 8, the cross shaft 13 will pivot at its pivot pin 18 relative to that same output member (which will remain stationary and act as a "steady") so that the other end of the cross shaft 13 will swing upwardly carrying with it the associated link 17 which will pivot at its pivot pins 18 and 21 relative to the cross shaft and the output member 20 to which it is connected to urge that output member axially upwardly. To compensate for the horizontal shortening of the distance between the axis 38 and the point at which the 'lifted' link 17 is connected to the cross shaft 13, the cross shaft will rotate in an anticlockwise sense in the lever block 3 under the constraint imposed on it by that link which will tilt towards the vertical as is permitted by the oversize slot 19 and play at the pivot pin 21 connecting its lower end to the associated output member 20. It will be apparent that the vertical static link 17, as the cross shaft 13 rotates, will also tilt towards the vertical as is permitted by its lower end connection 19,21 to its output member 20.

Pivotal movement of the operator lever 2 about the same axis 38 but in the opposite diagonal direction 35 will cause the various components to move in the opposite sense or direction from that just described with the previously stationary output member 20 continuing to act as a "steady" and the moved output member 20 this time being urged vertically downwardly as the cross shaft 13 rotates clockwise in the lever block 3.

When the operator lever 2 is pivoted in the diagonal direction 36 about an axis 39 passing through the centre of the ball 7 and the longitudinal axis 41 of that output member 20 which previously moved downwardly and upwardly, the ball stud 4 will again pivot in its housing 8 but this time that output member will remain stationary and serve as the "steady", so the opposite end of the cross shaft 13 will swing upwardly carrying with it the associated link 17 which will pivot at its pivot pins 18 and 21 relative to the cross shaft and the previously "steady" output member 20 to urge that output member axially upwardly. Again, the cross shaft 13 will be rotated in the lever block 3 by the "lifted" link 17, in an anticlockwise sense.

The reader will by now realize that when the operator lever is pivoted in the opposite diagonal direction 37 about the same axis 39, the static member 20 continues to act as a "steady" and the moved output member 20 is urged vertically downwardly with the cross shaft 13 rotated in a clockwise sense in the lever block 3.

As will be realized, the above-described movements of the cross shaft 13 and the 'lifted' link 7 upon pivoting of the operator lever 2 about the diagonal axis 38 or 39 are an amalgamation of those which occur individually when the operator lever 2 is pivoted about the mutually perpendicular axes 22,23.

By rearranging the components of the control box, as is fully described in our aforementioned patents, the operator lever 2 can be pivoted about mutually displaced axes to give a "+" movement of the lever. Those axes are, in fact, the same ones as the diagonal axes giving the "X" movement but with the components positioned so that the axes are angularly displaced through 45°. The resultant operating movements of the components are unchanged, and no further description of the "+" control box is thought necessary here.

The degree of vertical movement available to each operator rod 20 can be controlled by providing a pair of diametrically opposite lugs on each of the spring cups 25,26 which run in angularly displaced pairs of vertical channels 43 formed in the housing 27, the length of each pair of channels (which may be different) determining the degree of travel, up and down, of the operator rod.

It will be appreciated that a suitable gate could be provided to constrain the operator lever 2 to make only the "X" or "+" movements, as the case may be.

The dual axis "X" control box would be utilized when it is to be either at the side of the operator or between his legs, since it is found that then a diagonal arm movement is the easiest to apply. The "+" axis control box is used when it is to be positioned immediately forwardly of the operator, since the "+" direction of movement of the operator lever is then the most convenient.

Considering further the permutations of movements available to the output members 20 when the operator lever 2 is not provided with a gate but is free to make universal pivotal movement at the ball 7, one output member only can be moved axially in either of opposite directions whilst the other output member remains stationary, the other output member only can likewise be moved axially in either of opposite directions whilst the "one" output member remains stationary, or both output members can be moved axially by the same or different distances and in the same or different directions.

At all times, the two links 17 remain parallel to one another as viewed in FIGS. 1 and 3.

The control box is suitable for use in the remote control mechanism described in our United Kingdom Pat. No. 1,604,616 (when it would replace the control box featured in that mechanism) in which instance the control box would be positioned in the driver's cab of a tractor and serve to control via push-pull cables a pair of spool valves, one for each control cable, of a pair of hydraulic valves which could be located on an implement towed by the tractor and which hydraulically control two functions of that implement.

I claim:

1. A control device comprising a pivotable lever means, a pair of axially movable output members which are movable in response to pivotal movement of the lever means, a cross shaft mounted for rotation about its axis in said lever means, a pair of links one for each output member and pivotally connected to opposite ends of the cross shaft and each to the respective output member, and a ball stud carried by said lever means and of which the ball is mounted in a fixed ball housing by which to mount said lever means for said pivotal movement thereof.

2. A control device as claimed in claim 1, wherein the longitudinal axis of the ball stud is perpendicular to the axis of rotation of said cross shaft.

3. A control device as claimed in claim 1, wherein said lever means comprises an operator lever fast at one end with a lever block, said cross shaft being mounted for its said rotation in said lever block, and said ball stud being carried by said lever block.

4. A control device as claimed in claim 1, wherein axes of the pivotal connections between each link and the cross shaft and the respective output member are parallel to each other in one rotational position of said cross shaft, and to the longitudinal axis of said ball stud.

5. A control device as claimed in claim 4, wherein the pivot connection between each link and the respective output member allows for relative movement between them to compensate for changes in angular attitude in the link attendant upon pivotal movement of said lever means causing rotation of said cross shaft in said lever means.

6. A control device as claimed in claim 5, wherein said pivot connection comprises a slot in said output member in which said link is received and which is wider than said link and play between said link and the pivot pin which connects it to said output member.

7. A control device as claimed in claim 1, wherein an axis of pivotal movement of said lever means about an axis passing through the centre of said ball and parallel to the rotational axis of said cross shaft will cause simultaneous axial movement of said output members in the same direction which is determined by the sense of such pivotal movement.

8. A control device as claimed in claim 7, wherein said cross shaft, in response to said pivotal movement of said lever means causing simultaneous axial movement of said output members in the same direction, will rotate in said lever means in the opposite sense to that in which said lever means is pivoted, and each of said links will change its angular attitude as allowed by the pivot connection between said link and the respective output member.

9. A control device as claimed in claim 1, wherein pivotal movement of said lever means about the longitudinal axis of the ball stud will cause simultaneous axial movement of said output members in opposite directions determined by the sense of such pivotal movement.

10. A control device as claimed in claim 9, wherein said cross shaft, in response to said pivotal movement of said lever means causing simultaneous axial movement of said output member in opposite directions, will pivot as one with said lever means to urge said links in opposite directions, and each of said links will pivot at their pivot connections relative to said cross shaft and the respective output member.

11. A control device as claimed in claim 1, wherein pivotal movement of said lever means about an axis passing through the centre of the ball and an axis of either one of said output members effects axial movement of the other output member only the direction of which is dependent upon the sense of such pivotal movement.

12. A control device as claimed in claim 11, wherein said cross shaft will pivot with said lever means and rotate about its axis in said lever means upon said pivotal movement of said lever means causing axial movement of said other output member only.

13. A control device as claimed in claim 1, wherein said lever means can be universally pivoted in such a manner as to move axially in either of opposite directions one output member only whilst the other output member remains stationary, move axially in either of opposite directions said other output member whilst said one output member remains stationary, or move axially both output members by the same or different distances and in the same or different directions.

14. A control device as claimed in claim 1, including a spring means which is loaded upon axial movement of each of said output members either side of a predetermined position to impart a bias upon the output member tending to return it to said predetermined position but which is unloaded when the output member is in that position.

15. A control device as claimed in claim 14, wherein said spring means comprises a compression spring mounted about each output member and between a pair of abutment members of which a first one will move with said output member as said output member moves axially in one direction in response to a selected pivotal movement of said lever means and of which the second one is restrained at that time from movement with said output member so that said compression spring is compressed between said abutment members and acts through said first abutment member to exert a return bias upon said output member and hence said lever means, said second abutment member moving with said output member as said output member moves axially in the opposite direction in response to another selected pivotal movement of said lever means and said first abutment member being restrained at that time for movement with said output member so that said compression spring is compressed between said abutment members and acts through said second abutment member to exert a return bias upon said output member and hence said lever means.

16. A control device as claimed in claim 15, including a housing providing seatings for each pair of abutment members, a first urging means axially fast with each output member to urge, upon axial movement of the associated output member in said one direction, said first abutment member to move away from its seat and with said output member to compress said compression spring against said second abutment member which is restrained by its seat, at that time, in said housing thereby to be restrained against axial movement in said one direction with said output member, and a second urging means axially fast with each output member to urge, upon axial movement of said output member in said opposite direction, said second abutment member to move away from its seat and with said output member to compress said compression spring against said first abutment member which is restrained by its seat, at that time, thereby to be restrained against axial movement in said opposite direction with said output member.

17. A control device as claimed in claim 15, wherein each of said output members is slidably mounted in the associated pair of abutment members.

18. A control device as claimed in claim 1, including means for limiting the degree of axial travel available to each of said output members.

19. A control device as claimed in claim 18, wherein said limiting means comprises cooperating projection and track means associated with said abutment members and said housing.

20. A control device as claimed in claim 1, including a push-pull control cable operatively associated with each output member so that the core thereof will be translated upon axial movement of the associated output member.

21. A control device comprising,
a lever means,
a ball stud carried by said lever means and of which the ball is mounted in a fixed ball housing by which to mount said lever means for pivotal movement,
a cross shaft mounted for rotation about its longitudinal axis in said lever means, the ball stud having a longitudinal axis which is perpendicular to the longitudinal axis of said cross shaft,
and a pair of links, one of each output member and pivotally connected to opposite ends of the cross shaft and each to a respective output member, the axes of the pivotal connections between each said link and said cross shaft being parallel to each other in one rotational position of said cross shaft and parallel to the longitudinal axis of said ball stud, wherein pivotal movement of said lever means about an axis passing through the center of said ball and parallel to the rotational axis of said cross shaft will effect via said cross shaft simultaneous axial movement of said output members in the same direction which is determined by the sense of such pivotal movement, said cross shaft being responsive to said pivotal movement of said lever means to rotate in said lever means in the opposite sense to that in which said lever means is pivoted, pivotal movement of said lever means about the longitudinal axis of said ball stud will cause simultaneous axial movement of said output members in opposite directions determined by the sense of such pivotal movement, said cross shaft being responsive to said pivotal movement of said lever means to pivot as one therewith to urge said links in said opposite directions, and pivotal movement of said lever means about an axis passing through the center of said ball and the longitudinal axis of either one of said output members will cause axial movement of the other output member only in a direction of which is determined by the sense of such pivotal movement, said cross shaft being responsive to said pivotal movement of said lever means both to pivot therewith and rotate about its longitudinal axis in said lever means by which to cause said axial movement of said other output member only.

* * * * *